United States Patent [19]

Kuo

[11] Patent Number: 4,639,391
[45] Date of Patent: Jan. 27, 1987

[54] THICK FILM RESISTIVE PAINT AND RESISTORS MADE THEREFROM

[75] Inventor: Charles C. Y. Kuo, Elkhart, Ind.

[73] Assignee: CTS Corporation, Elkhart, Ind.

[21] Appl. No.: 711,983

[22] Filed: Mar. 14, 1985

[51] Int. Cl.$^4$ ............................................. H01B 1/06
[52] U.S. Cl. .................................... 428/210; 338/308; 252/518; 252/520; 427/101; 427/126.2; 427/126.1; 427/126.4; 427/376.2; 427/376.3; 29/620
[58] Field of Search ................. 252/518, 520; 338/20, 338/308; 428/210; 427/101, 102, 126.1, 126.2, 126.4, 376.1, 376.2, 376.3; 29/610 R, 620

[56] References Cited

U.S. PATENT DOCUMENTS

| | | | |
|---|---|---|---|
| 2,891,914 | 6/1959 | Fenity et al. | 252/518 |
| 3,027,332 | 3/1962 | Medin | 252/520 |
| 3,498,832 | 3/1970 | Wilson | 117/201 |
| 3,661,595 | 5/1972 | Buck | 106/1 |
| 4,039,997 | 8/1977 | Huang et al. | 338/308 |
| 4,323,484 | 4/1982 | Hattori et al. | 252/518 |

FOREIGN PATENT DOCUMENTS 1559523  1/1980  United Kingdom .

OTHER PUBLICATIONS

"A Novel Conducting Glaze," Edna A. Dancy.

Primary Examiner—Josephine L. Barr
Attorney, Agent, or Firm—Rodger H. Flagg

[57] ABSTRACT

This invention relates to thick film base metal resistive paints for firing on a substrate to form a resistor having a temperature coefficient of resistance within ±100 ppm/°C., while providing a means to selectively blend the resistive paint to provide a wide range of decade resistivities from less than 10 ohms/square to more than 1K ohms/square. The sheet resistance and TCR are controlled by mixing a glass frit from at least one of a first and second glass material; with $TiSi_2$; and at least one of $Ti_5Si_3$ and $AL_2O_3$; and a screening agent, for subsequent screening onto a substrate and firing in an inert atmosphere at a peak temperature of about 900° C. The first glass material comprises, by weight, 5 to 10% $SiO_2$; 30 to 50% BaO; 40 to 60% $B_2O_3$ and 1 to 5% CuO. The second glass material comprises, by weight, 50 to 70% $B_2O_3$; 25 to 45% SrO; and 2 to 10% $SiO_2$. The quantity of the glass material is increased to raise sheet resistance in ohms per square, and to lower the value of the TCR. The quantity of $TiSi_2$ is increased to lower sheet resistance in ohms per square, and to raise the TCR. The quantity to $TiSi_2$ is increased to lower sheet resistance in ohms per square, and to raise the TCR. The quantity of $Ti_5Si_3$ is increased to lower the sheet resistance in ohms per square, and to lower the TCR. The quantity of $Al_2O_3$ is increased to raise the sheet resistance in ohms per square, and to lower the TCR. The screening agent preferably has no carbon residue when pyrolytically decomposed during firing in an inert atmosphere.

20 Claims, 15 Drawing Figures

| | EX. #1 | EX. #2 | EX. #3 | EX. #4 | EX. #5 | EX. #6 | EX. #7 | EX. #8 |
|---|---|---|---|---|---|---|---|---|
| PAINT A | 100% | 98% | 97% | 96% | 0% | 0% | 0% | 0% |
| PAINT B | 0% | 0% | 0% | 0% | 100% | 98% | 97% | 96% |
| $Al_2O_3$% | 0% | 2% | 3% | 4% | 0% | 2% | 3% | 4% |
| OHMS/SQ | 50 | 115 | 185 | 260 | 60 | 150 | 250 | 380 |
| CTCR | 238 | 164 | 124 | 100 | 161 | 133 | 105 | 89 |
| HTCR | 218 | 156 | 114 | 93 | 212 | 139 | 100 | 85 |
| STOL | 0.06 | 0.10 | 0.11 | 0.08 | 0.36 | 0.17 | 0.09 | 0.02 |
| THERMAL STABILITY | 0.58 | 0.19 | 0.14 | 0.15 | 0.19 | 0.13 | 0.14 | 0.20 |

Ω/□ VS FIRING TEMPERATURE

TCR VS FIRING TEMPERATURE

Ω/□ VS NO. OF FIRING
900°C

TCR VS NO. OF FIRING
900°C

|  | EX. #9 | EX. #10 | EX. #11 | EX. #12 | EX. #13 | EX. #14 | EX. #15 | EX. #16 | EX. #17 | EX. #18 | EX. #19 | EX. #20 |
|---|---|---|---|---|---|---|---|---|---|---|---|---|
| TiSi$_2$ | 29.2% | 23.6% | 16% | 28% | 27% | 24% | 23% | 22% | 18% | 23.7% | 29% | 28% |
| Al$_2$O$_3$ | 2.6% | 5.7% | 4% | 2% | 3% | 1% | 2% | 3% | 2% | 5.2% | 1% | 2% |
| GLASS I | 68.2% | 70.7% | 80% | 0% | 0% | 0% | 0% | 0% | 0% | 0% | 35% | 35% |
| GLASS II | 0% | 0% | 0% | 70% | 70% | 75% | 75% | 75% | 80% | 71.1% | 35% | 35% |
| OHMS/SQ | 101 | 1.8K | 608 | 1.3K | 1.9K | 413 | 2.1K | 5.5K | 8.2K | 1.1K | 1.7K | 2.4K |
| CTCR | 68 | 2 | 77 | -40 | -40 | 36 | -12 | -19 | -107 | -6 | -3 | -33 |
| HTCR | 79 | 9 | 71 | -5 | -18 | 52 | 4 | -71 | -88 | 0 | 35 | 8 |

FIG. 8

|  | EX. #27 | EX. #28 | EX. #29 |
|---|---|---|---|
| $TiSi_2$ | 29.2% | 12% | 20.6% |
| $Ti_5Si_3$ | 0% | 18% | 9% |
| $Al_2O_3$ | 2.6% | 0% | 1.3% |
| GLASS I | 68.2% | 35% | 51.6% |
| GLASS II | 0% | 35% | 17.5 |
| OHMS/SQ. | 166 | 6 | 101 |
| CTCR | 50 | 146 | 83 |
| HTCR | 60 | 144 | 83 |

FIG. 10

|  | EX. #21 | EX. #22 | EX. #23 | EX. #24 | EX. #25 | EX. #26 |
|---|---|---|---|---|---|---|
| $Ti_5Si_3$ | 20% | 18% | 20% | 18% | 18% | 20% |
| $TiSi_2$ | 10% | 12% | 10% | 12% | 12% | 5.2% |
| GLASS I | 70% | 70% | 0% | 0% | 35% | 37.4% |
| GLASS II | 0% | 0% | 70% | 70% | 35% | 37.4% |
| OHMS/SQ. | 3 | 8 | 9 | 400 | 5 | 10 |
| CTCR | -21 | 56 | -12 | 6 | 51 | 38 |
| HTCR | -46 | -61 | -74 | 16 | -62 | -56 |

FIG. 9

THICK FILM RESISTIVE PAINT AND RESISTORS MADE THEREFROM

TECHNICAL FIELD

The present invention relates to base metal resistive paint, resistors made from a resistive paint, and a method for making the resistor and resistive paint. More particularly, this invention relates to thick film base metal resistive paints for firing on a substrate to form a resistor having a controlled sheet resistance and TCR by mixing a glass frit from at least one of a first and second glass material; with $TiSi_2$; and at least one of $Ti_5Si_3$ and $Al_2O_3$; and a screening agent, for subsequent firing in an inert atmosphere at a peak temperature of about 900° C. The screening agent preferably has no carbon residue when pyrolytically decomposed during firing in an inert atmosphere.

BACKGROUND ART

Metal silicide films may be processed by spraying and heating a metal silicide solution; by evaporation or sputtering technology, by chemical vapor disposition, or by thick film technology.

Thick film technology has been used in the electronics industry for more than 25 years. Thick film technology includes printing and firing a resistive paint in a desired pattern upon a suitable substrate. Resistive paints used in thick film technology typically include a conductive material, a glass frit, and a screening agent.

A base metal resistive paint is a resistive paint having no noble metals included in its composition.

Early thick film resistive paints varied primarily in the composition of the conductive materials. The glass frit, after melting, was used primarily as a bonding agent to bond the conductive material to the substrate. The chemical composition of the glass frit was selected in regard to its melting point which was required to be below the melting point of the conductive material used. The screening agent was selected for consistency and ease of printing. Commercially available glass frits and screening agents were typically used.

Chemical compounds found in a typical glass frit are inorganic, such as minerals. These chemicals typically exhibit a number of undesirable properties, such as: high TCR; widely variable thermal stability; poor short time overload characteristics; variable resistance values due to uneven mixing; and visible cracks and fissures.

Certain materials were typically mixed with metal silicide powder to obtain the wide range of resistivity and low TCR (temperature coefficient of resistance) desired.

British Pat. No. 1,559,523 disclosed a resistor composition selected from tungsten disilicide, molybdenum disilicide, vanadium disilicide, titanium disilicide, zircohium disilicide, chromium disilicide and tantalum disilicide and fired at 970° C. to 1150° C.

U.S. Pat. No. 2,891,914 disclosed a fired electrical resistor made from $MoSi_2$ and a borosilicate glass frit.

U.S. Pat. No. 3,027,332 disclosed the use of silicides of Mo, Cr, V, Ti, Zr and Tr. Historically, silicide resistors were fired between 970° to 1150° C., and some as high as 1300° C.

U.S. Pat. No. 3,498,832 disclosed a fired electrical resistor using $Cr_3Si$ and $TaSi_2$.

U.S. Pat. No. 3,661,595 discloses use of molybdenum silicide and tungsten silicide for use in making a fired electrical resistor.

U.S. Pat. No. 4,309,997 discloses a resistance material employing a metal silicide selected from $MoSi_2$; $WSi_2$; $VSi_2$; $TiSi_2$; $ZrSi_2$, $CrSi_2$ and $TaSi_2$ fired at 970° C. to 1150° C.

A paper entitled "A Novel Conducting Glaze" by E. Dancy was published in Ceramic Bulletin, Volu,e 55, No. 6 in 1976, which mentioned using $MoSi_2$ as a conductive material for use in thick film resistors.

DISCLOSURE OF THE INVENTION

While the use of a variety of metal silicides is known to the art, the present invention discloses a base metal resistive paint for firing on a substrate to form a resistor having a temperature coefficient of resistance within ±100 ppm/°C., while providing a means to selectively blend the resistive paint to provide a wide range of decade resistivities from less than 10 ohms/square to more than 1K ohms/square, while firing at a preferred temperature of about 900° C. at uniform belt speeds. The disclosed invention provides resistive paints exhibiting stringent temperature coefficient of resistance values; as well as excellent short time overload and thermal stability characteristics, even when fired at different firing times and various belt speeds.

Therefore, one object of the invention is to provide a means to control the resistivity and TCR of a base metal resistive paint by selectively mixing at least one of a first and second glass material with $TiSi_2$, and at least one of $Ti_5Si_3$ and $Al_2O_3$, and a screening agent to make a base metal resistive paint suitable for screening upon a substrate and firing at a peak temperature of 900° C. to form a base metal resistor having a controlled sheet resistance of ±100 ppm/°C.

Another object is to mix a glass frit from at least one of a first and second glass material having relatively higher and lower sheet resistance and TCR, to aid in control of the sheet resistance and TCR of the resistive paint.

Another object is to control the quantity of $TiSi_2$ mixed in the resistive paint, wherein an increase in $TiSi_2$ lowers the sheet resistance in ohms/square, while raising the value of the TCR.

Another object is to control the quantity of $Al_2O_3$ mixed in the resistive paint, wherein an increase in $Al_2O_3$ raises the sheet resistance in ohms/square, while lowering the value of the TCR.

Yet another object is to disclose a method for preparing an improved base metal resistive paint.

Still another object is to provide an improved base metal resistor mixed from a glass frit, a controlled quantity of $TiSi_2$ and at least one of $Ti_5Si_3$ and $Al_2O_3$, and a screening agent.

Still another object is to provide a resistor made from a resistive paint embodying any combination of the objects previously disclosed.

The above-mentioned and other features and objects to this invention and the manner of attaining them will be best understood by reference to the following description of an embodiment of the invention, when considered in conjunction with the accompanying drawings.

BRIEF DESCRIPTION OF THE DRAWINGS

FIG. 8 is a chart comparing the effects of varying $TiSi_2$ and $Al_2O_3$ with glass I and glass II.

FIG. 9 is a chart comparing the effects of varying $Ti_5Si_3$ and $TiSi_2$ with glass I and glass II.

FIG. 10 is a chart comparing the effects of varing $TiSi_2$, $Ti_5Si_3$ and $Al_2O_3$ with glass I and II.

BEST MODE FOR CARRYING OUT THE INVENTION

Figures 1, 7:
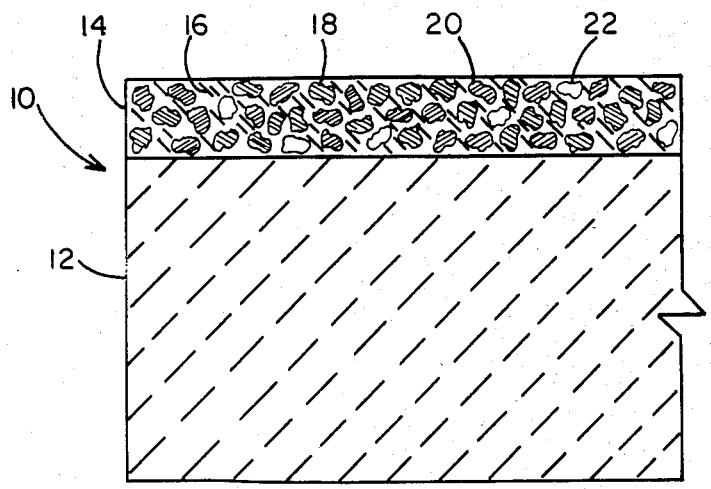
FIG. 1 shows a partial sectional view of a resistor prior to firing made with the resistive paint of the present invention.
FIG. 7 is a chart comparing the effects of varying paint A and B with $Al_2O_3$.

The subject matter which I regard as my invention is particularly pointed out and distinctly claimed in the claims. The structure and operation of my invention, together with further objects and advantages, may be better understood from the following description given in connection with the accompanying drawings, in which:

FIG. 1 shows a base metal resistor of the present invention prior to firing, generally designated 10. Resistor 10 comprises a substrate 12, such as a ceramic substrate, having a conductive layer, and a layer of the resistive paint 14 of the present invention screened or otherwise coated thereon for subsequent firing. The resistive paint 14 comprises a mixture of a glass frit 16, a quantity of $TiSi_2$ designated 18, and a quantity of at least one of $Ti_5Si_3$ designated 20 and $Al_2O_3$ designated 22, and a screening agent 24.

The glass frit 16 is selected from at least one of a first and second glass material 26, 28 respectively, chosen for its effect on resistivity in ohms/square, and for its effect on TCR.

The first glass material 26 comprises, by weight, 5 to 10% $SiO_2$; 30 to 50% BaO; 40 to 60% $B_2O_3$ and 1 to 5% CuO.

The second glass material 28 comprises, by weight, 50 to 70% $B_2O_3$; 25 to 45% SrO; and 2 to 10% $SiO_2$.

The quantity of the first glass material 26 is increased to raise the sheet resistance in ohms/square, and to lower the value of the TCR, in glass frit 16.

The quantity of the second glass material 28 is increased to raise the sheet resistance in ohms/square, and to lower the value of the TCR in glass 16, but the second glass material 28 raises the sheet resistance and TCR more than the first glass material 26. Thus by selectively mixing first and second glass materials 26, 28, to form glass frit 16, the resulting sheet resistance values and TCR may be more precisely controlled.

The solvent used for making the screening agent can be pine oil, terpineol, an ester alcohol of Texanol from Texas Eastman Company, butyl carbitol acetate or the like. The resins used for binders can be polyalkylmethacrylate available from DuPont or Rohm and Haas; or polybutenes available as Amoco H-25, Amoco H-50, and Amoco L-100 from Amoco Chemicals Corporation. A wetting agent may be added to wet the solid powders for good paint rheology.

Some commercially available screening agents after firing in an inert atmosphere at high temperature contain carbon residue, which is conductive. Such carbon residue is not combined with oxygen to form a carbon oxide during heating in an inert atmosphere, therefore the carbon in the screening agent remains in the resistive paint, adversely affecting the controlled performance characteristics of resistor 10. Therefore, the screening agent used preferably has no carbon residue when pyrolytically decomposed during firing in an inert atmosphere. The screening agent 24 preferably forms no carbon residue when pyrolytically decomposed in an inert atmosphere, such as 10% butyl-methacrylate dissolved into 90% pine oil.

NOTE: all compositions disclosed herein are based upon weight percentage.

Figure 11:
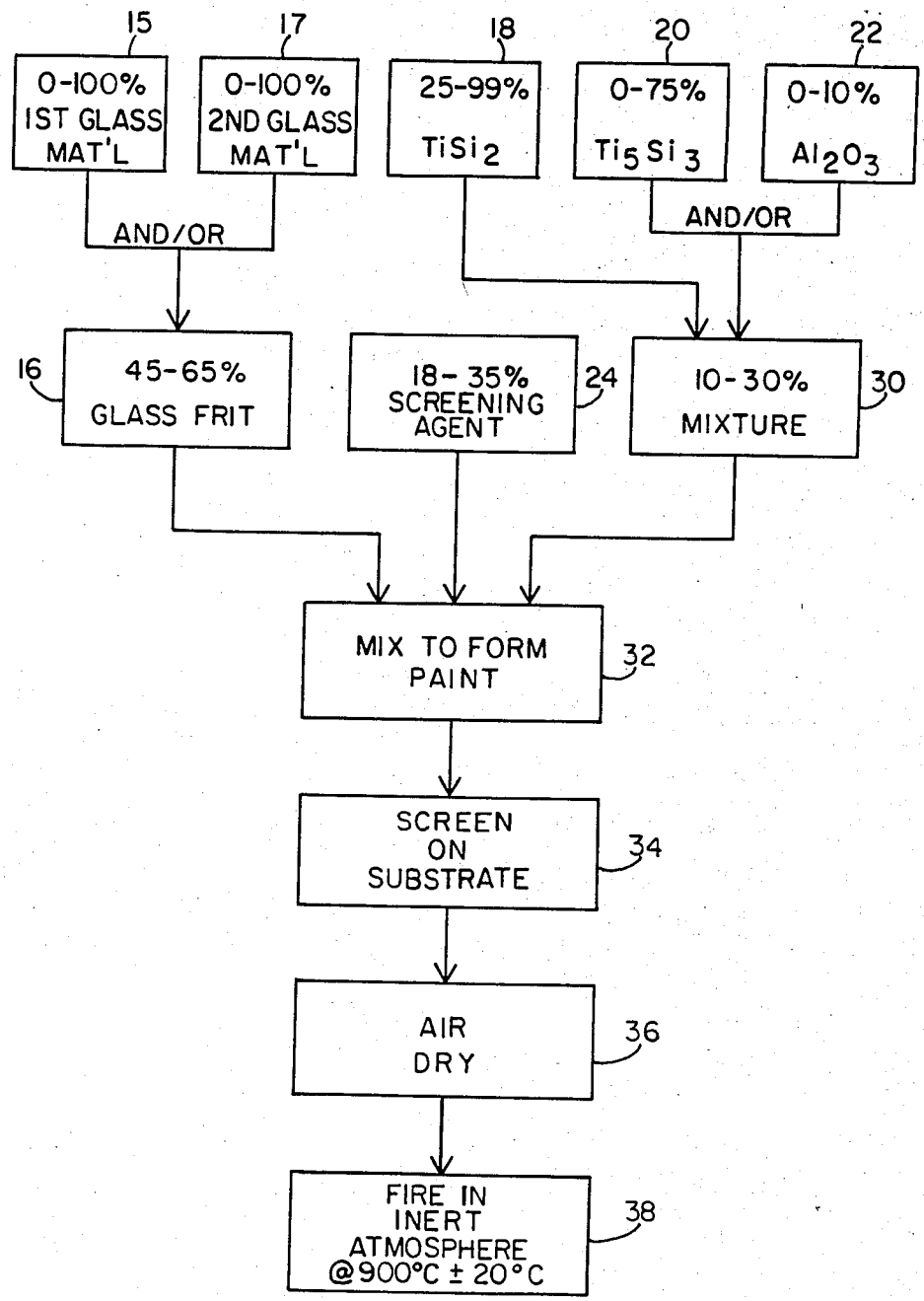
FIG. 11 is a flow chart detailing the steps in making a resistor from a resistive paint made by the preferred invention.

As shown in FIG. 11, the glass frit 16 was made by well mixing the selected quantities of at least one of the first and second glass materials 26, 28, and melting the glass material by firing at 1000° C.–1100° C. in a furnace, then quenching and ball-milling the fired glass into a fine powder glass frit 16, having a particle size of less than 10 microns.

$TiSi_2$ has a density of 4.40 g/cc; a melting point of 1540° C.; resistivity in micro ohm-cm of 618; and is orthorhombic in crystal form. 25 to 99% $TiSi_2$ is mixed with at least one of $Ti_5Si_3$ and $Al_2O_3$, to obtain the desired resistivity and TCR.

$Ti_5Si_3$ has a density of 4.32 g/cc; a melting point of 2150° C., resistivity in micro ohm-cm of 350, and is hexagonal in crystal form.

$Al_2O_3$ has a density of 3.96, a melting point of 2045° C., resistivity in micro ohm-cm that is very high, and exhibits a varied crystal form.

$TiSi_2$ is mixed with 0–75% $Ti_5Si_3$ and/or 0 to 10% $Al_2O_3$ to blend mixture 30. The cost of $TiSi_2$, $Ti_5Si_3$ and $Al_2O_3$ are inexpensive compared with the cost of precious metals.

Mixture 30 is preferably of a particle size of less than 10 microns. Mixture 30 is mixed 32 with glass frit 16 and screening agent 24 to form resistive paint 14, suitable for screening 34 onto substrate 12. 10–30% mixture 30 is well mixed with 18–35% screening agent 24 and 45–65% glass frit 16, preferably through a three roll mill to yield a consistent resistive paint 14 for easy screening 34.

Resistive paint 14 is preferably screened 34 through a 165 to 325 mesh, stainless steel screen, with resistor pattern 35 formed thereon. As resistive paint 14 is screened 34 onto substrate 12, the resistor pattern 35 on the screen is transferred to substrate 12.

The resistive paint 14 screened 34 upon substrate 12 is preferably allowed to air dry 36 at 100° C. to 150° C. prior to firing 38 in an inert atmosphere at a peak operating temperature of 900° C.±20°.

In the following examples: Cold TCR (CTCR) was tested at −55° C. to +25° C.; Hot TCR (HTCR) was tested at +25° C. to 125° C.; Thermal Stability was tested at 150° C. for 48 hours; Short Time Overload (STOL) was tested at 500 volts or 5 watts maximum; and the resistor size tested was 0.62×0.156 inches, or 2.5 squares.

As shown in FIG. 7, Paint A comprises 30% $TiSi_2$ + 70% glass frit made from the first glass material 15. Paint B comprises 25% $TiSi_2$ + 75% glass frit made from the first glass material 15.

In examples #1 through #4, Paint A was mixed with varying amounts from 0 to 4% of $Al_2O_3$, and the effects on resistance in ohms/square, CTCR, HTCR, STOL and thermal stability were noted.

In examples #5 through #8, Paint B was mixed with varying amounts from 0 to 4% of $Al_2O_3$, and the effects noted for comparison with examples #1 through 4. From a comparison of results of examples #1 through 8, it can be seen that sheet resistances are increased with increases in the amount of $Al_2O_3$ present in the mixture, and the TCR and CTRC are gradually reduced to within ±100 ppm/°C. At the same time, thermal stability is preferably less than 0.25%.

As shown in FIG. 8, in examples #9 through #11, varying amounts of $TiSi_2$ and $Al_2O_3$ were mixed with the glass frit made from the first glass material 15, labeled Glass I, and the effects on resistance in ohms/square CTCR and HTCR noted. An additional test, not included in FIG. 8 was made using 30% $TiSi_2$ and 70% glass frit made from the first glass material, with no $Al_2O_3$ present, which produced a sheet resistance of 40 ohms/square, a CTCR of 172 PPM/°C., and a HTCR of 162 ppm°C.

It can be seen from these examples that $Al_2O_3$ is effective in combination with $TiSi_2$ and the glass frit of Glass I in adjusting the value of CTCR and HTCR to within ±100 ppm/°C.

Examples #12 through 18 compare the use of varying amounts of $TiSi_2$ with $Al_2O_3$ and the glass frit made from the second glass material 17, labeled Glass II. In these examples it is noted that substantially higher sheet resistance, and substantially lower CTCR and HTCR are obtained, than were obtained in Glass I.

It should also be noted that the average particle size of $TiSi_2$ in examples #1 through #26, ranged from 2 to 5 microns. If the particle size is decreased to 0.6 microns, the resulting sheet resistance will become higher, and the TCR will become lower.

Examples #19 through #20 in FIG. 8 show the results of combining equal amounts of Glass I and Glass II, while varying the amount of $Al_2O_3$ from 1% to 2%.

FIG. 9 shows the effect of $Ti_5Si_3$ when used in combination with Glass I and/or Glass II and $TiSi_2$. Typically, $Ti_5Si_3$ has the effect of decreasing the sheet resistance, while decreasing the TCR, as compared with the $TiSi_2$ resistors previously disclosed.

Examples #21 and 190 22 compare the effect of Glass I with varying amounts of $TiSi_2$ and $Ti_5Si_3$. Examples #23 and #24 compare the effect of Glass II with varying amounts of $TiSi_2$ and $Ti_5Si_3$. Examples #25 and #26 show the effect of varying amounts of $TiSi_2$ and $Ti_5Si_3$ with equal amounts of Glass I and Glass II.

Example #26 was made in several lots, with different screening sizes, viscosity and film thicknesses. These variables effected the sheet resistance from 9 to 13 ohms/square, but the TCR remainder within ±100 ppm/°C.

FIG. 10 shows examples #27, #28 and #29, wherein varying amounts of Glass I and Glass II are mixed with varying amount of $TiSi_2$ and at least one of $Ti_5Si_3$ and $Al_2O_3$ to obtain the sheet resistances and TCR's noted. Example #29 is exemplary of the invention, and has been reproduced in numerous lots, with the tested sheet resistance maintained at 100 ohms/square ±10% and the TCR within ±100 ppm/°C.

Figure 2A:
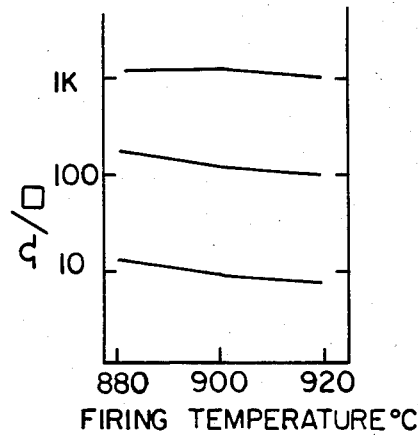
FIG. 2A shonws a graph comparing the effect of firing temperature on resistivity in ohms/square of the disclosed resistive paint FIG. 2B shownns a graph comparing the effects of firing temperature on TCR in ppm/°C.

FIG. 2A showns the effect of firing temperature on resistors having a sheet resistance of 10, 100, and 1000 ohms/square as shown in examples #18, 26 and 29. The preferred firing temperature is 900° C.±20° C.

Figure 2B:
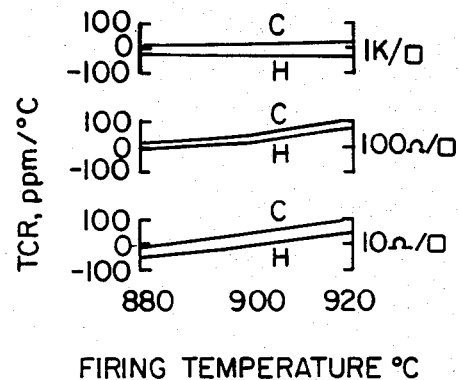

FIG. 2B showns the effect of firing temperature on TCR. Within the firing temperature range noted, the HTCR and CTCR remain within ±100 ppm/°C.

For efficiency, and ease of manufacture, it is desirable to be able to fire different decade resistor paints at a fixed peak temperature to yield consistent results.

The three decade resistor paints of examples #18, 26 and 29 were tested at 880° C. to 920° C. The chage in sheet resistance remained within ±10%, and the TCRs were less than ±100 ppm/°C.

Figure 3A:
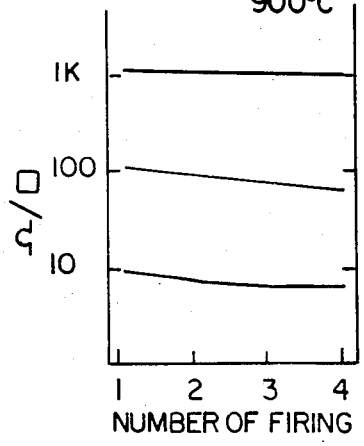
FIG. 3A shows a graph comparing the number of firings on the resistivity in ohms/square.
Figure 3B:
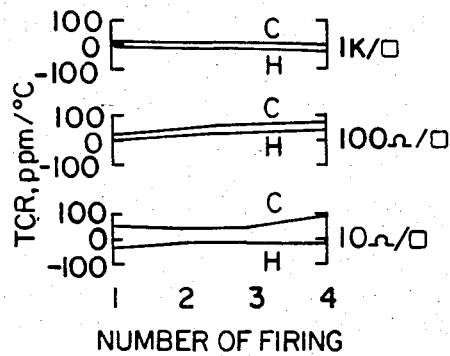
FIG. 3B shows a graph comparing the number of firings on TCR in ppm/°C.

FIGS. 3A and 3B shows the effect of repeated firing on sheet resistance and TCR. Ideally, the change in resistance should be small and the TCRs remain within ±100 ppm/°C. As shown in FIGS. 3A and 3B, the change in resistance is within ±10% and the TCRs are within ±100 ppm/°C., after four repeated firings of the disclosed resistive paint.

Figure 4A:
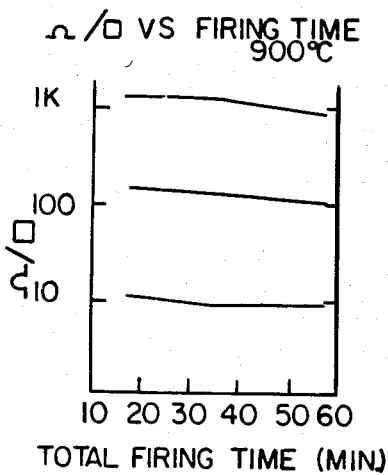
FIG. 4A shows a graph comparing the total firing time to the resistivity on ohms/square.
Figure 4B:
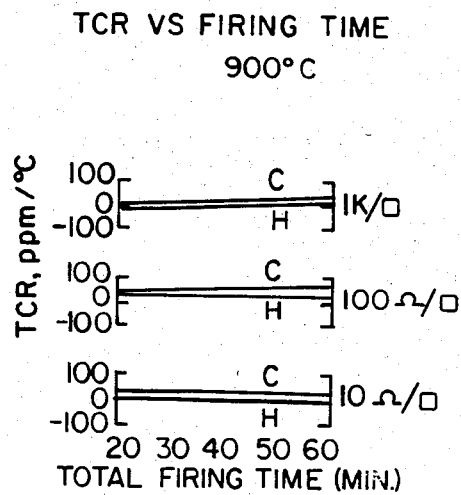
FIG. 4B shows a graph comparing the total firing time to TCR in ppm/°C.

FIGS. 4A and 4B compare the firing time on sheet resistance and TCRs. Firing time is one of the variables effecting the performance characteristics of a resistor made from base metal resistive paints. The total firing time was tested at 18 to 60 minutes at 900° C., which is the equivalent to 3 to 10 inches per minute belt speed in a belt furnace. As shown in FIG. 4A, the sheet resistance was less than ±10%. As shown in FIG. 4B, the TCRs remained within ±100 ppm/°C.

Figure 5A:
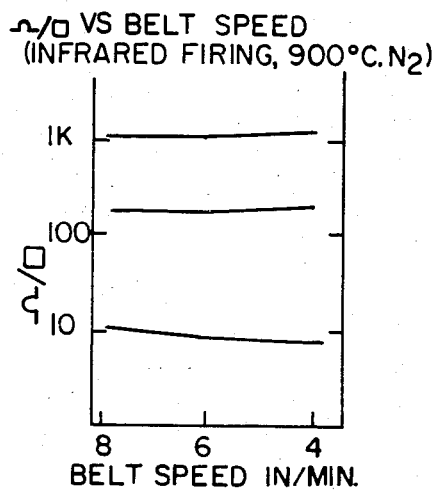
FIG. 5A shows a graph comparing the belt speed to the resistivity in ohms/square.
Figure 5B:
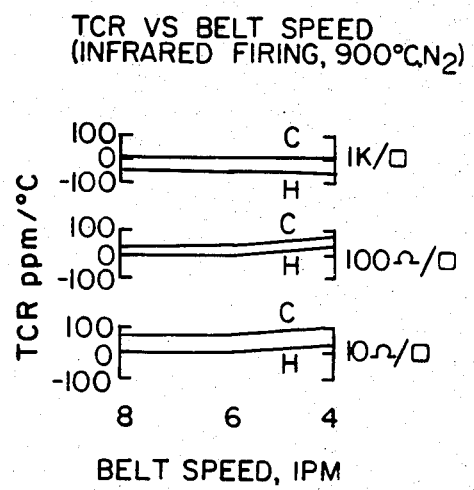
FIG. 5B shows a graph comparing the belt speed to TCR, in ppm/°C.

FIGS. 5A and 5B show the effect of belt speed in inches per minute on sheet resistance and TCRs, in infrared firing at 900° C. in a $N_2$ atmosphere. Examples 26, 29 and 18, representing 10, 100 and 1000 ohms/square respectively, were fired in an infrared furnace at 900° C. in a nitrogen atmosphere, with belt speeds of 8, 6 and 4 inches per minute. As shown in FIG. 5A, the sheet resistance remained within ±10%. As shown in FIG. 5B, the TCRs remained within ±100 ppm/°C.

Figure 6:
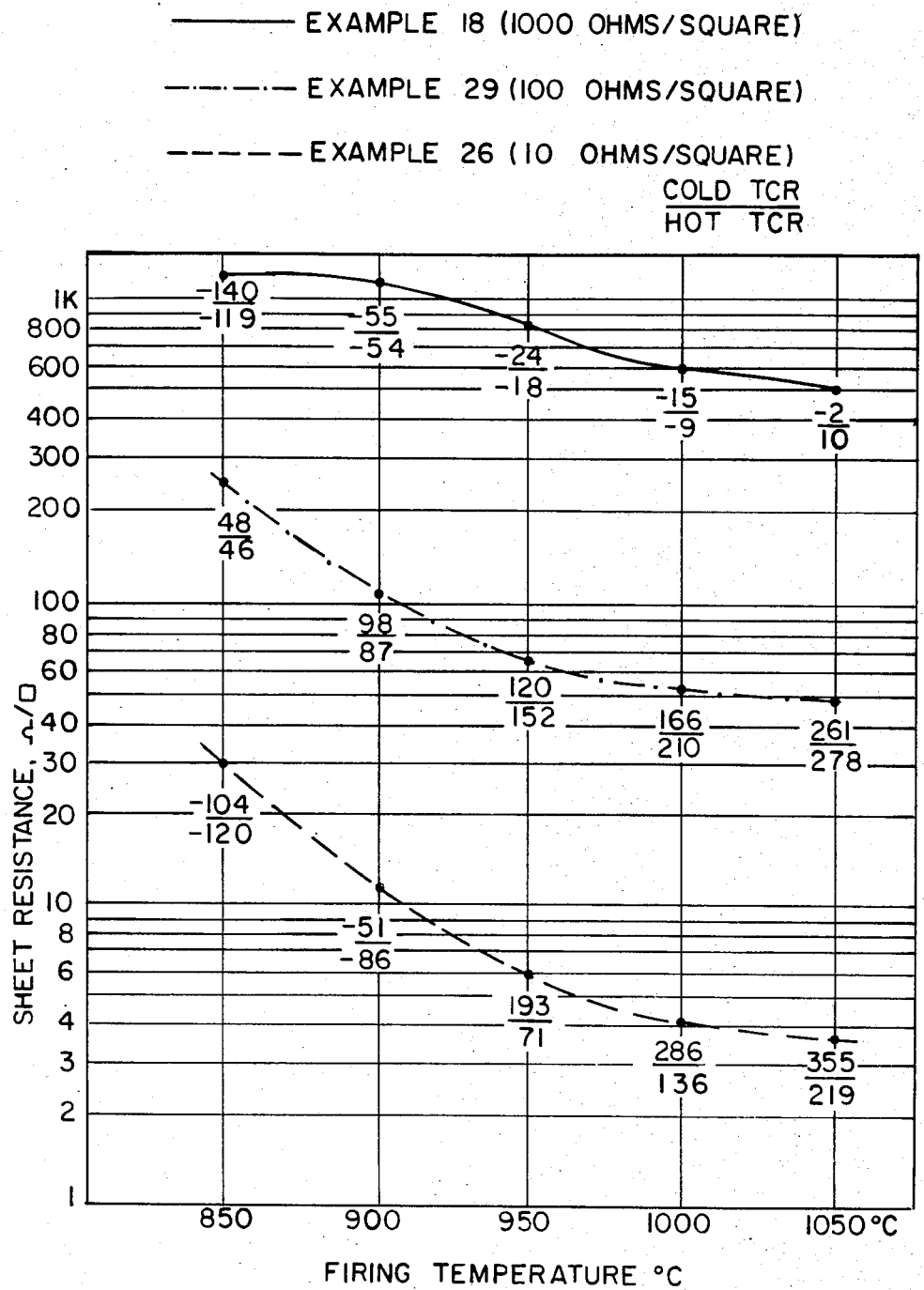
FIG. 6 is a graph comparing the effects of firing temperature on resistivity in ohms/square and hot and cold TCR.

As shown in FIG. 6, examples 26, 29 and 18 (10, 100 and 1000 ohms/square, respectively) are fired at various firing temperatures from 850°–1050° C., and their respective sheet resistances shown in solid or dashed lines. The CTCR and HTCR are also noted with the CTCR shown above the HTCR. At 900° C.±20° C. the sheet resistances are within ±10%, and the TCRs remain less than ±100 ppm/°C.

Current noise is one of the important performance characteristics of resistors. Typically, thick film resistors yield lower current noise than most carbon resistors. Current noise was measured for 0.062″×0.125″ resistors of the disclosed invention, with a Quantech Model 315B noise meter. The noise indexes were: −32, −28 and −20 db respectively for examples 26, 29 and 18 (10, 100 and 1000 ohms/square). These results are comparable to or better than the most stringent current noise requirements of ruthenium based resistors.

Tests of laser trimibility provided excellent results. Resistance tests of examples 26, 29 and 18 (10, 100 and 1000 ohms/square) disclose resistance changes after trimming of less than 0.2%.

The preferred particle size of $Al_2O_3$ is less than 10 microns. Particle size of 1 to 3 microns were found most suitable. However, if the particle size becomes less than 1 micron, it reacts with the glass, blistering the glass. If the particle size is too large, the fired surface will become rough.

If the quantity of $Al_2O_3$ is too great, the short time overload will become too high, and may not pass performance specifications.

If too much glass frit is used in the formulation of the resistive paint, the sheet resistance will increase and the TCRs become more negative, and the resistor surface becomes more glossy.

If the quantity of $TiSi_2$ becomes too great, the sheet resistance decreases, the TCRs increase becoming more positive, and the thermo stability decreases.

The resistive paint of the formulation herein disclosed may be screened upon a substrate and fired at a peak temperature of 900° C.±20° C. to make a base metal resistor of the preferred invention.

Therefore, while this invention has been described with reference to a particular embodiment, it is to be understood that modifications may be made without departing from the spirit of the invention or from the scope of the following claims.

INDUSTRIAL APPLICABILITY

This invention discloses a base metal resistive paint for subsequent screening and firing on a substrate to make a base metal thick film resistor for use in an electronic circuit.

I claim:

1. A base metal resistor paint having a controlled sheet resistance and TCR, which comprises:
   (a) mixing a glass frit selected from a quantity of at least one of a first and second glass material, the first glass material comprising 5 to 10% $SiO_2$, 30 to 50% BaO, 40 to 60% $B_2O_3$ and 1 to 5% CuO; and the second glass material comprising 50 to 70% $B_2O_3$, 25 to 40% SrO, and 2 to 10% $SiO_2$;
   (b) mixing 45 to 60% of the glass frit with from 10 to 30% of a mixture comprising $TiSi_2$ and at least one of $Ti_5Si_3$ and $Al_2O_3$; and
   (c) blending the glass frit and the mixture of $TiSi_2$ and at least one of $Ti_5Si_3$ and $Al_2O_3$ with from 18 to 35% of a screening agent to form a resistor paint therefrom, for subsequent screening upon a substrate and firing in an inert atmosphere to form a resistor exhibiting controlled sheet resistance and TCR.

2. The paint of claim 1, in which the quantity of at least one of the first and second glass material is increased to raise sheet resistance in ohms per square, and to lower the value of the TCR.

3. The paint of claim 1, in which the quantity of $TiSi_2$ is increased to lower sheet resistance in ohms per square, and to raise the TCR.

4. The paint of claim 1, in which the quantity of $Al_2O_3$ is increased to raise the sheet resistance in ohms per square, and to lower the TCR.

5. The paint of claim 1, in which the quantity of $Ti_5Si_3$ is increased to lower the sheet resistance in ohms per square, and to lower the TCR.

6. The paint of claim 1, in which the ratio of $Al_2O_3$ to $TiSi_2$ is from 0 to 10%; the ratio of $Ti_5Si_3$ to $TiSi_2$ is from 0 to 75%; and the ratio of the resulting mixture to the glass frit is from 15 to 40%.

7. The paint of claim 1, in which the glass frit is ground to a particle size of less than 10 microns, prior to mixing.

8. The paint of claim 1, in which the screening agent forms no carbon residue when pyrolytically decomposed in an inert atmosphere.

9. The paint of claim 1, in which a binding resin is present in the screening agent.

10. The mixture of claim 1, in which 18 to 35% screening agent is added to the mixture to yield a consistent resistive paint for screening printing onto a substrate prior to firing.

11. The paint of claim 1, in which the temperature coefficient of resistance is within ±100 ppm/°C.

12. The paint of claim 1, in which the $TiSi_2$ is ground to a particle size of less than 10 microns prior to mixing.

13. The paint of claim 1, in which at least one of the $Ti_5Si_3$ and $Al_2O_3$ are ground to a particle size of less than 10 microns, prior to mixing.

14. A base metal resistor paint of claim 1, wherein the resistor paint is screened upon a substrate and fired at a peak temperature of 900°±20° C.

15. A method for preparing a base metal resistive paint for screening upon a substrate to form a resistive pattern thereon, which comprises:
   (a) mixing from 45 to 65% of a glass frit from at least one of a first and second glass material, the first glass material comprising 5 to 10% $SiO_2$, 30 to 50% BaO, 40 to 60% $B_2O_3$ and 1 to 5% CuO, and a second glass material comprising 50 to 70% $B_2O_3$, 25 to 40% SrO, and 2 to 10% $SiO_2$;
   (b) mixing from 45% to 65% of the glass frit with from 10 to 30% of a mixture comprising $TiSi_2$ and at least one of $Ti_5Si_3$ and $Al_2O_3$;
   (c) blending the glass frit and the mixture of $TiSi_2$ and at least one of $Ti_5Si_3$ and $Al_2O_3$ with from 18 to 35% of a screening agent having no carbon residue when pyrolytically decomposed in an inert atmosphere;
   (d) screening the resistive paint thus made onto a substrate;
   (e) drying the screened substrate in air; and
   (f) firing the screened substrate in an inert atmosphere at a peak temperature of 900° C.±20° C.

16. The paint of claim 1, wherein the screened substrate is dried in air at a temperature of 100° C. to 150° C. prior to firing.

17. A thick film base metal resistor having a substrate with a a resistive paint screened and fired thereon, wherein the improvement comprises:
   (a) controllably blending a glass frit selected from at least one of a first and second glass material, the first glass material comprising 5 to 10% $SiO_2$, 30 to 50% BaO, 40 to 60% $B_2O_3$ and 1 to 5% CuO; and the second glass material comprising 50 to 70% $B_2O_3$, 25 to 45% SrO, and 2 to 10% $SiO_2$;
   (b) mixing 45 to 65% of the blended glass frit with 10 to 30% of a selected mixture comprising $TiSi_2$ and at least one of $Ti_5Si_3$ and $Al_2O_3$;
   (c) screening the resistive paint onto a substrate;

(d) drying the screened substrate in air prior to firing; and (e) firing the screened substrate in an inert atmosphere at a peak firing temperature of approximately 900° C., wherein the selected quantity of the first and second glass material and the selected mixture of $TiSi_2$ and at least one of $Ti_5Si_3$ and $Al_2O_3$, provide a means to control the sheet resistivity and the TCR of the base metal resistor made therefrom.

18. The resistor of claim 17, in which the quantity of the $TiSi_2$ is increased to lower the sheet resistance in ohms per square, and to increase the TCR.

19. The resistor of claim 17, in which the quantity of at least one of the second glass material, and the quantity of the $A_2O_3$ is increased to raise the sheet resistance in ohms per square, and to lower the TCR.

20. The resistor of claim 17, in which the ratio of $Al_2O_3$ to $TiSi_2$ is from 0 to 10%; the ratio of $Ti_5Si_3$ to $TiSi_2$ is from 0 to 75%; and the ratio of the resulting mixture to glass frit is from 15 to 40%.

* * * * *